United States Patent
Patel et al.

(10) Patent No.: US 10,521,159 B2
(45) Date of Patent: Dec. 31, 2019

(54) NON-DISRUPTIVE AUTOMATIC APPLICATION REGROUPING

(71) Applicant: NETAPP, INC., Sunnyvale, CA (US)

(72) Inventors: Nikul Patel, San Jose, CA (US); Prathamesh Deshpande, Folsom, CA (US); Rupa Natarajan, Sunnyvale, CA (US); Anureita Rao, San Jose, CA (US); Vikhyath Rao, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 15/786,682

(22) Filed: Oct. 18, 2017

(65) Prior Publication Data

US 2019/0114117 A1   Apr. 18, 2019

(51) Int. Cl.
| | |
|---|---|
| G06F 3/06 | (2006.01) |
| G06F 16/27 | (2019.01) |
| G06F 16/242 | (2019.01) |
| G06F 16/176 | (2019.01) |
| G06F 16/11 | (2019.01) |

(52) U.S. Cl.
CPC .......... *G06F 3/0689* (2013.01); *G06F 16/128* (2019.01); *G06F 16/1767* (2019.01); *G06F 16/244* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 7,930,476 B1 | 4/2011 | Castelli et al. | |
| 8,082,330 B1 | 12/2011 | Castelli et al. | |
| 9,817,807 B1 | 11/2017 | Nagaradde et al. | |
| 9,893,953 B1 | 2/2018 | Gastelli et al. | |
| 2005/0246397 A1* | 11/2005 | Edwards | G06F 16/10 |
| 2005/0246503 A1* | 11/2005 | Fair | G06F 16/10 711/147 |
| 2008/0022012 A1 | 1/2008 | Wang | |
| 2013/0111034 A1 | 5/2013 | Upadhya | |
| 2016/0012070 A1* | 1/2016 | Aggarwal | G06F 16/128 707/638 |
| 2016/0042090 A1 | 2/2016 | Mitkar et al. | |
| 2016/0154592 A1* | 6/2016 | Goodman | G06F 3/0617 711/165 |
| 2016/0246683 A1* | 8/2016 | Vijayan | G06F 16/184 |
| 2018/0129821 A1* | 5/2018 | Havewala | G06F 3/0644 |

OTHER PUBLICATIONS

Non-Final Office Action on co-pending U.S. Appl. No. 15/607,340 dated Jan. 22, 2019.

(Continued)

*Primary Examiner* — Charles Rones
*Assistant Examiner* — Jonah C Krieger
(74) *Attorney, Agent, or Firm* — Klein, O'Neill & Singh, LLP

(57) ABSTRACT

Presented herein are system and method for providing a non-disruptive mechanism for splitting a parent volume located on a first aggregate into a new volume, the method comprising: splitting the parent volume, by the network storage system, into a new volume, wherein the new volume comprises an application; and providing a snapshot of the parent volume at the new volume.

17 Claims, 7 Drawing Sheets

(56) References Cited

OTHER PUBLICATIONS

Non-Final Office Action dated May 2, 2019 for U.S. Appl. No. 15/607,348.
Notice of Allowance on co-pending U.S. Appl. No. 15/607,348 dated Oct. 17, 2019.
Final Office Action on co-pending U.S. Appl. No. 15/607,340 dated Aug. 16, 2019.

* cited by examiner

NON-DISRUPTIVE AUTOMATIC APPLICATION REGROUPING

TECHNICAL FIELD

The present disclosure relates generally to mass data storage networks and data storage filing systems. More particularly, aspects of this disclosure relate to methods, non-transitory computer readable media, and devices for providing an efficient non-disruptive mechanism for splitting a volume at any given directory into a new volume and accessing old snapshots of the split volume.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

A file system layout may apportion an underlying physical volume into one or more virtual volumes (vvols) of a storage system. An example of such a file system layout is described in U.S. patent application Ser. No. 10/836,817 titled EXTENSION OF WRITE ANYWHERE FILE SYSTEM LAYOUT, by John K. Edwards et al., now issued as U.S. Pat. No. 7,409,494 on Aug. 5, 2008 and assigned to Network Appliance, Inc. The underlying physical volume is an aggregate comprising one or more groups of disks, such as RAID groups, of the node. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

File systems may incorporate a cloning technique that enables efficient and substantially instantaneous creation of a clone that is a writable copy of a "parent" virtual volume (vvol) in an aggregate of a storage system. An example of such a cloning technique is described in the above-incorporated U.S. patent application Ser. No. 10/837,254 titled CLONING TECHNIQUE FOR EFFICIENTLY CREATING A COPY OF A VOLUME IN A STORAGE SYSTEM, by John K. Edwards et al. now issued as U.S. Pat. No. 7,409,511 on Aug. 5, 2008 and assigned to Network Appliance, Inc. The clone is instantiated by, e.g., loading a file system associated with the new vvol onto the clone and bringing the clone "online", with the only blocks owned by the clone comprising its modified volinfo block. The file system executes on the clone as it would on a typical vvol, such as the parent vvol. In fact, the file system within the clone resembles the file system within a base snapshot, since they comprise substantially the same blocks on disk. The resulting clone is thus a "full-fledged" vvol, i.e., it can service storage (read and write) requests and has its own logical properties. As a result, the cloning technique enables the clone and parent vvol to share on-disk blocks of data in a zero-copy fashion, while also allowing for modifications.

As can be appreciated, in typical file systems, multiple applications are hosted within a single write-anywhere file system flexible volume (flexvol). All items that belong to an application are rooted under a particular directory within the volume. In some applications, a volume can be implemented as a unit of data management. In order to provide Application level data management, it is required to host each application in its own volume. This can require splitting the single volume hosting multiple applications into multiple volumes where the split-point is the directory that hosts the application. Furthermore, items of an application, such as for example, files, logical unit numbers (luns) or directories, are created first and then grouped together into an application with the appropriate Service Levels. Since snapshots are taken at a volume boundary, it is optimal to have items split into multiple volumes based on required Service Levels.

Figure 1:
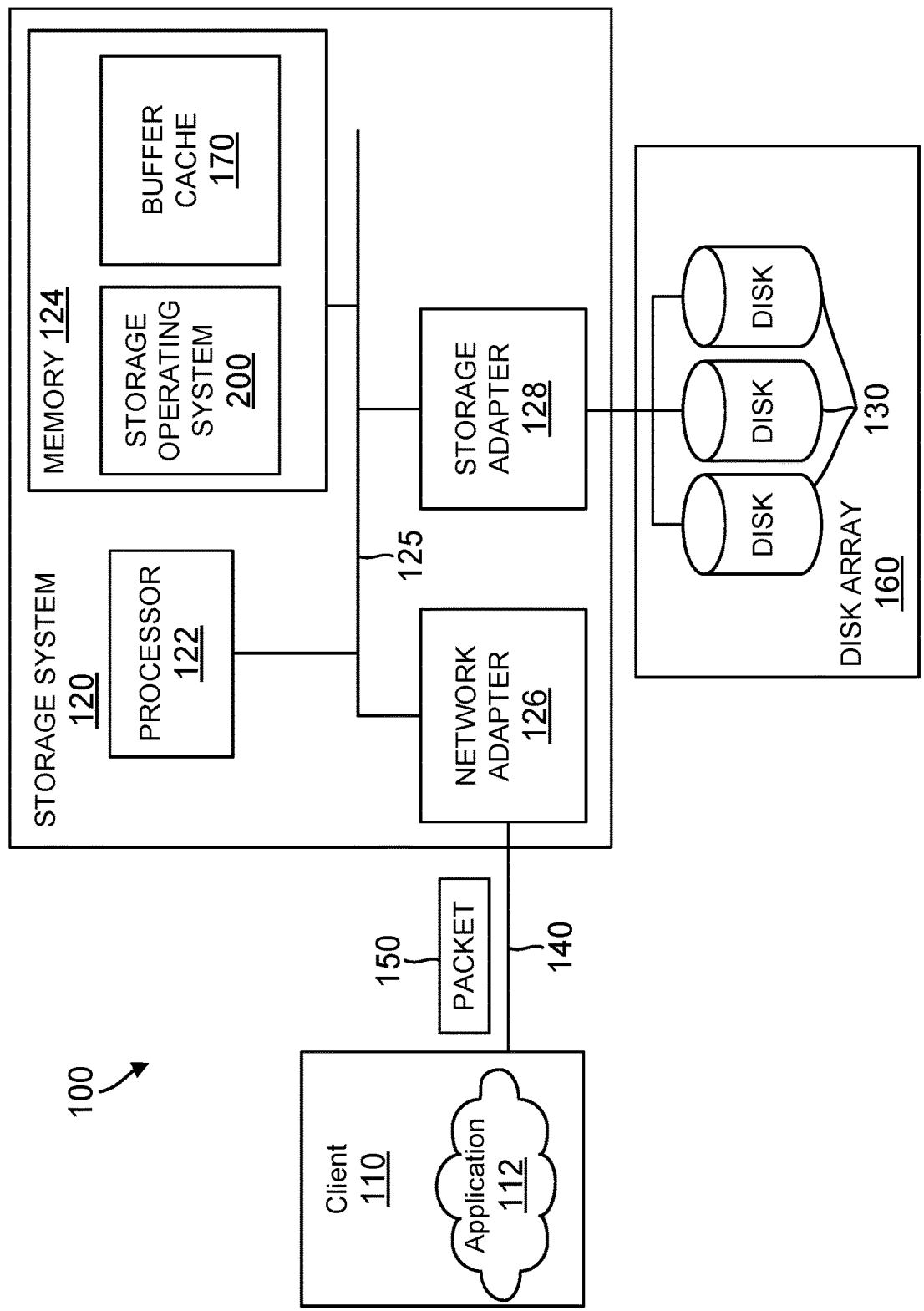
FIG. 1 is a schematic block diagram of an environment including a storage system that may be advantageously used with the present disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for providing an efficient non-disruptive mechanism for splitting a volume at any given directory into a new volume and accessing old snapshots of the split volume. As used herein, the term "file system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood by those skilled in the art that the disclosure described herein may apply to any type of special-purpose (e.g., file server, filer or storage serving appliance) or general-purpose computer, including a standalone computer or portion thereof (i.e. a workload), embodied as or including a storage system. Moreover, the teachings of this disclosure can be adapted to a variety of storage system architectures including, but not limited to, a network-attached storage (NAS) environment, a storage area network (SAN), a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a write anywhere file system.

It is desirable to provide a system and method for providing an efficient non-disruptive mechanism for splitting a volume at any given directory into a new volume and accessing old snapshots of the split volume. One way to do so is by either creating a clone volume on the same aggregate as the parent volume, or creating a copy volume on a different aggregate as the parent volume. In some embodiments, an application is hosted on the new volume to provide application level data management. After splitting the volume, snapshot access can be provided for older snapshots from the source volume.

The data structure of the split volume can be configured implementing an ancestry metafile and an incore hash of directory file-identifiers ("file-ids"). The metafile maintains two mappings for every directory within a volume. The first mapping includes a directory and its child-directories. The second mapping includes a directory and its sibling directories. The two mappings are implemented to construct the incore hash of directory file-identifiers ("file-ids"). This incore hash is constructed on the volume after it is split. The ancestry metafile is traversed starting at the directory. The directory serves as the split-point. Thus, all directories that exist under the split point are added to the incore hash.

At the time of split, the list of snapshot identifiers ("snap-ids") that have the split-point directory can be copied to the new volume. In this way, snapshots that are valid for the split sub-tree can be detected. On the new volume, incore truncate the rootdir of snapshots to show only the split sub-tree. Furthermore, an access to an old snapshot from the new volume will forward the access to the source volume to obtain information from the source volume and respond to client ops on the new volume. In some embodiments, snapids that do not contain the split point can be reused on the new volume for new snapshots after the split. Once split, the volume is enabled to take snapshots as long as there are free snapids.

Referring now to the drawings, wherein like reference numerals refer to like features throughout the several views, there is shown in FIG. 1 is a schematic block diagram of an environment 100 including a storage system 120 that may be advantageously used with the present disclosure. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing data structures associated with the present disclosure. The processor and adapters may, in turn, comprise processing elements and/or logic circuitry configured to execute the software code and manipulate the data structures. Storage operating system 200, portions of which is typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when to accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 2:
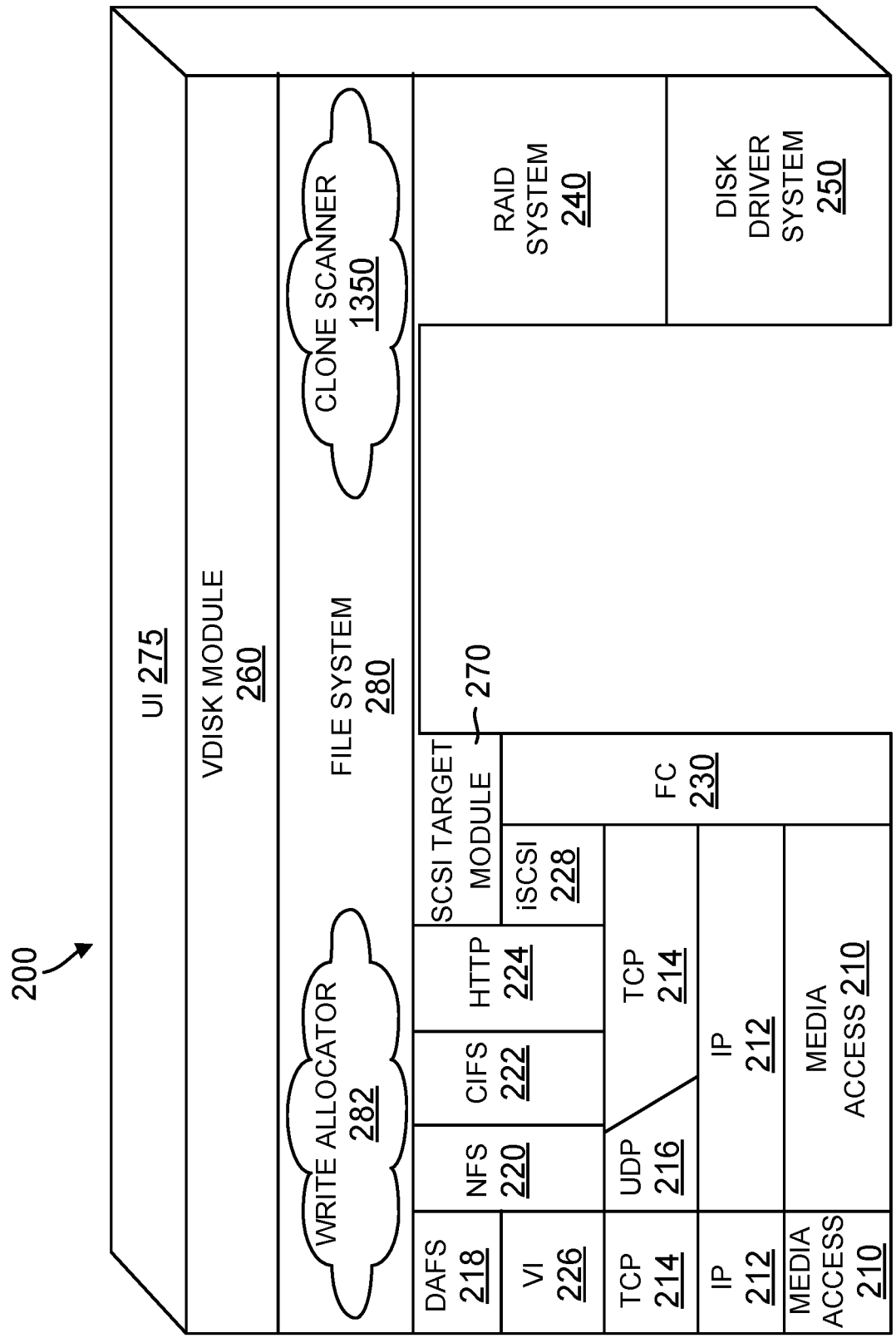
FIG. 2 is a schematic block diagram of the storage operating system that may be advantageously used with the present disclosure.

FIG. 2 is a schematic block diagram of the storage operating system 200 that may be advantageously used with the present disclosure. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 260 and SCSI target module 270. The vdisk module 260 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the write-anywhere file system having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

The write-anywhere file system further supports multiple persistent consistency point images (PCPIs) that are generally created on a regular schedule. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. For the purposes of the present disclosure, the PCPI is a point-in-time representation of a volume.

Figure 3:
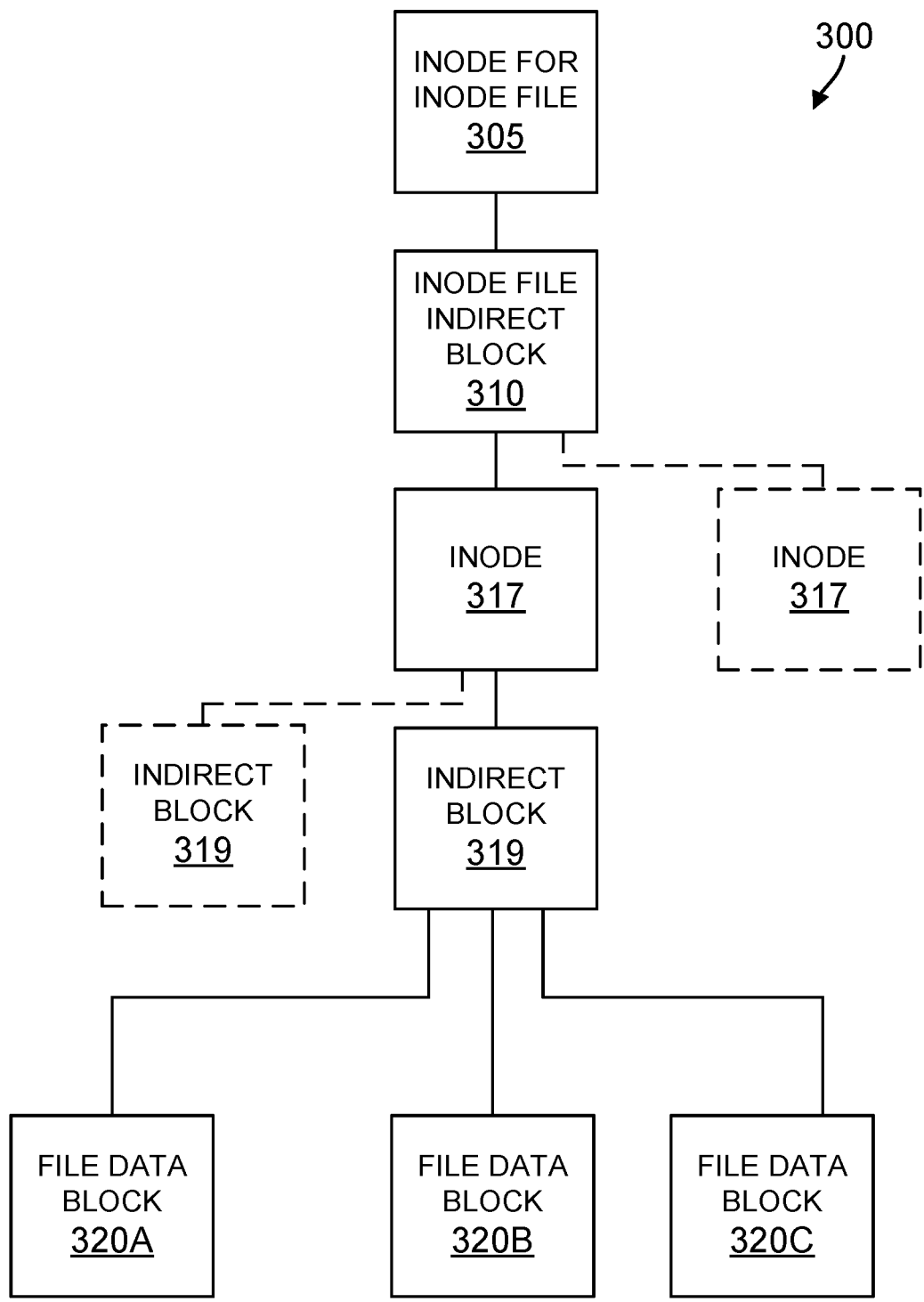
FIG. 3 is an exemplary file system inode structure in accordance with embodiments of the disclosure.

Broadly stated, a PCPI is stored on-disk along with the active file system, and is called into the memory of the storage system as requested by the storage operating system. The on-disk organization of the PCPI and the active file system can be understood from the following description of an exemplary file system inode structure 300 shown in FIG. 3. The inode for an inode file 305 contains information describing the inode file associated with a file system. In this exemplary file system inode structure, the inode for the inode file 305 contains a pointer that references (points to) an inode file indirect block 310. The inode file indirect block 310 contains a set of pointers that reference inode file blocks, each of which contains an array of inodes 317, which in turn contain pointers to indirect blocks 319. The indirect blocks 319 include pointers to file data blocks 320A, 320B and 320C. Each of the file data blocks 320(A-C) is capable of storing, e.g., 4 kilobytes (kB) of data.

Figure 4:
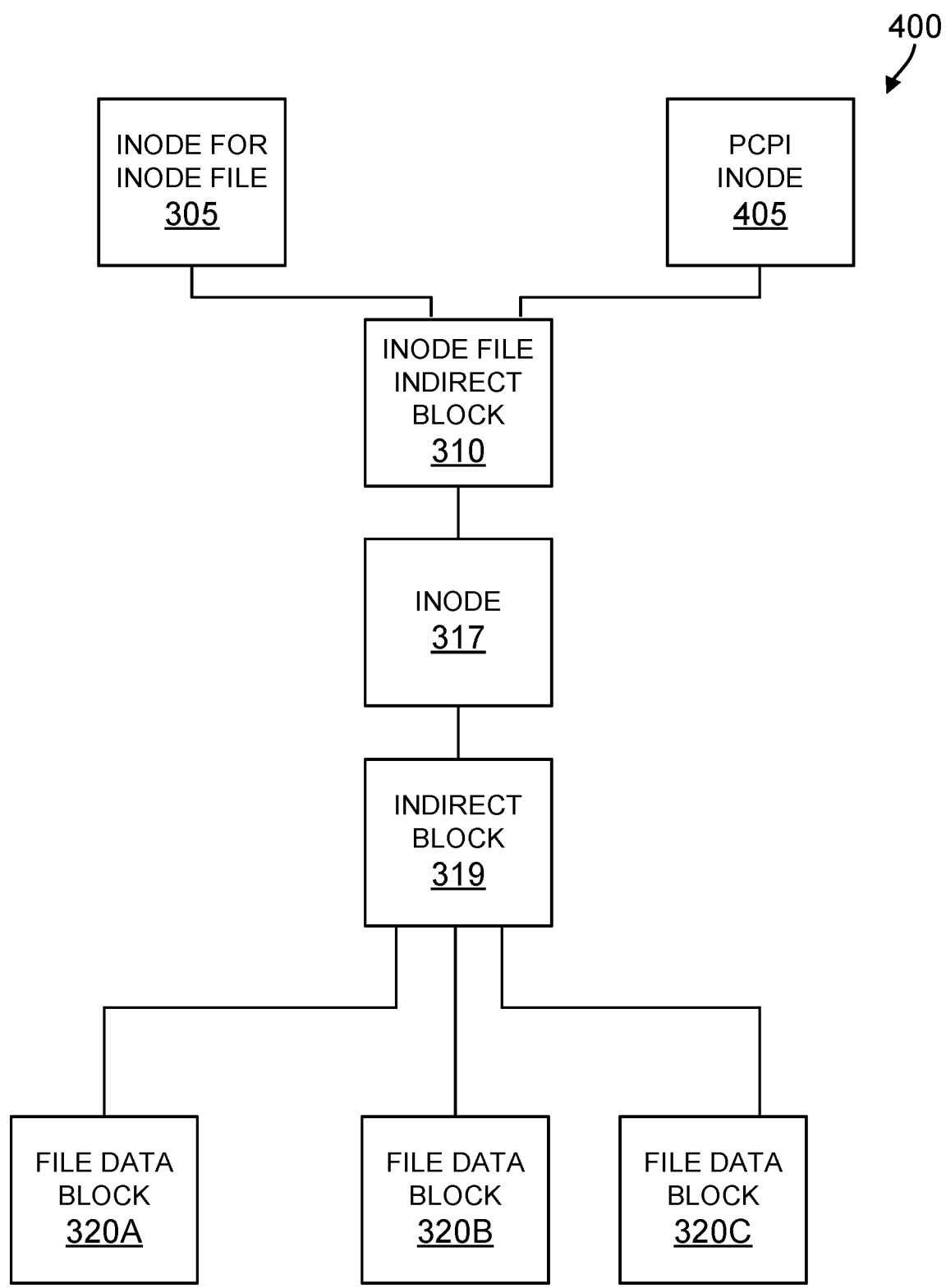
FIG. 4 is an exemplary PCPI inode in accordance with embodiments of the disclosure.

When the file system generates a PCPI of its active file system, a PCPI inode is generated as shown in FIG. 4. The PCPI inode 405 is, in essence, a duplicate copy of the inode for the inode file 305 of the file system inode structure 300 that shares common parts, such as inodes and blocks, with the active file system. For example, the exemplary file system inode structure 400 includes the inode file indirect blocks 310, inodes 317, indirect blocks 319 and file data blocks 320A-C as in FIG. 3. When a user modifies a file data block, the file system writes the new data block to disk and changes the active file system to point to the newly created block. In an exemplary file system, a file data block can be modified where the contents of the modified file data block are written to a new location on disk as a function of the exemplary file system. Because of this new location, the indirect block 319 must be rewritten. Due to this changed indirect block 319, the inode 317 must be rewritten. Similarly, the inode file indirect block 310 and the inode for the inode file 305 must be rewritten.

Thus, after a file data block has been modified, the PCPI inode 405 contains a pointer to the original inode file indirect block 110 which, in turn, contains pointers through the inode 117 and indirect block 119 to the original file data blocks 120A, 120B and 120C. The newly written indirect block 319 also includes pointers to unmodified file data blocks 120A and 120B. That is, the unmodified data blocks in the file of the active file system are shared with corresponding data blocks in the snapshot file, with only those blocks that have been modified in the active file system being different than those of the snapshot file.

However, the indirect block 319 further contains a pointer to the modified file data block 120C' representing the new arrangement of the active file system. A new inode for the inode file 305 is established representing the new structure 300. Note that metadata (not shown) stored in any snapshotted blocks (e.g., 405, 110, and 120C) protects these blocks from being recycled or overwritten until they are released from all snapshots. Thus, while the active file system inode for the inode file 305 points to new blocks 310, 317, 319, 120A, 120B and 120C', the old blocks 405, 110 and 120C are retained until the snapshot is fully released.

Multiple applications can be hosted within the file system 280. All items that belong to the application can be rooted under a particular directory within a volume on array 160. For some applications, a volume can be implemented as a unit of data management. In order to provide application level data management, it may be required to host each application in its own volume on array 160. This can require splitting the single volume hosting multiple applications into multiple volumes where the split-point is the directory that hosts the application. Furthermore, items of an application, such as for example, files, logical unit numbers (luns) or directories, are created first and then grouped together into an application with the appropriate Service Levels. Since PCPIs are generally taken at a volume boundary, it is optimal to have items split into multiple volumes based on required Service Levels.

The present disclosure employs a volume splitting technique that, as noted, enables efficient and substantially instantaneous creation of a volume that is a copy of a parent vvol in an aggregate of a storage system. The aggregate is a physical volume comprising one or more groups of disks, such as RAID groups, underlying one or more vvols of the storage system. The aggregate has its own physical volume block number (pvbn) space and maintains metadata, such as block allocation bitmap structures, within that pvbn space. The parent vvol may be a typical vvol that, like any vvol, has its own virtual volume block number (vvbn) space and maintains metadata, such as block allocation bitmap structures, within that vvbn space. The metadata maintained by the vvol can be referred to as ancestry metadata. The data structure of the split volume can be configured implementing an ancestry metafile and an incore hash of directory file-identifiers ("file-ids"). The metafile maintains two mappings for every directory within a volume. The first mapping includes a directory and its child-directories. The second mapping includes a directory and its sibling directories. The two mappings are implemented to construct the incore hash of directory file-identifiers ("file-ids"). This incore hash is constructed on the volume after it is split. The ancestry metafile is traversed starting at the directory. The directory serves as the split-point. Thus, all directories that exist under the split point are added to the incore hash.

The ancestry metafile can be created and maintained within the vvol. Specifically, on every volume that needs to be split, an ancestry metafile can be created. The metafile can be updated as part of every directory created and deleted. When a volume is split, a determination can be made whether the volume can be created on the same aggregate. For example, if the volume can be created on the same aggregate, a volume clone operation can be used. If the volume cannot be created on the same aggregate, the volume clone operation cannot be used and can be replaced by a volume-copy ("vol-copy") operation. A volume clone can be created based on a snapshot of the source volume. The ancestry metafile on the cloned volume can be present on the destination volume as part of the private metadata. Furthermore, the root directory is truncated on the clone. The directory entry for the split-point directory can be created in the root directory.

An empty directory fileid hash can be created. Furthermore, the volume can be accessible for read/write access. Any additional directory operation at this time, updates the ancestry metafile and incore hash. The incore hash of the directory fileids can be constructed by traversing the ancestry metafile. A background scanner can be initiated to cleanup inodes not covered within the split-point directory. Background scanner can be an inode file ("inofile") scanner which traverses the inofile. For every inode, the background scanner can perform a series of validations. For example, the background scanner can determine is the inode unused. If the inode is determined to be unused, the background scanner continues since there is nothing to be deleted. The background scanner can determine if the inode is directory. If the background scanner determines if the inode is a directory, then the background scanner can verify if it is in the incore directory fileid hash. If the directory inode is not in the incore directory fileid hash, then the inode and its corresponding data is deleted. If the background scanner determines the inode is not a directory, then the background scanner can determine if its parent is in the incore directory fileid hash. If the inode parent is not in the in the incore directory fileid hash, then the inode and its corresponding data can be deleted. Thus, the split point directory on the source volume can be truncated and the background scanner can remove stale inofile entries to enable client traffic as soon as the subdir truncation is complete.

After splitting the volume, the ancestry metadata can be created for each subsequent volume. If the volume can be created on the same aggregate, a volume clone operation is implemented. If the volume cannot be created on the same aggregate, the volume clone operation cannot be used and has to be replaced by a vol-copy operation. Both operations are discussed in greater detail below.

Figure 5:
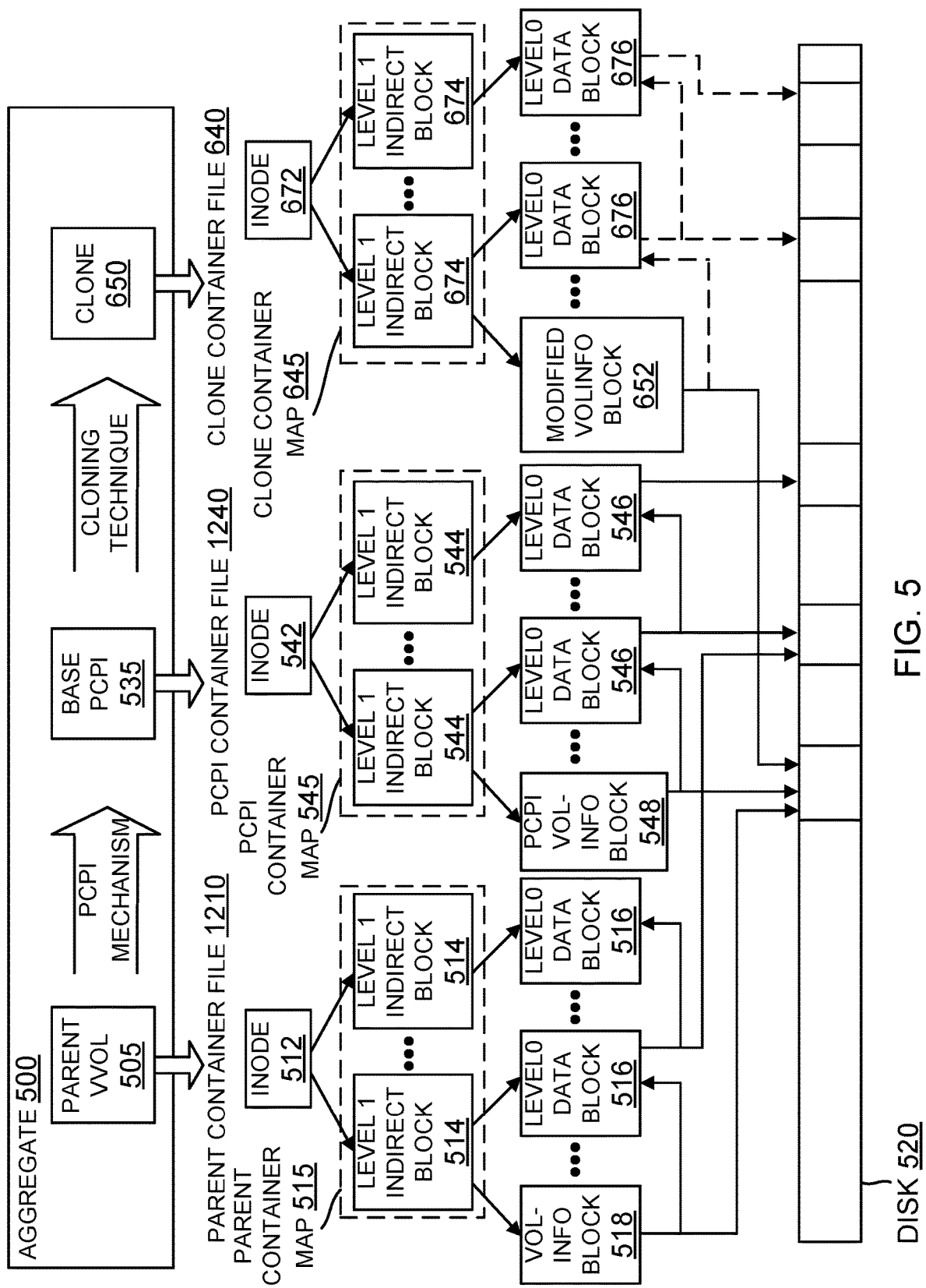
FIG. 5 is a schematic block diagram illustrating an embodiment of an aggregate that may be advantageously used with the present disclosure.

Volume Cloning:

As noted, the present disclosure employs a cloning technique that can enable efficient and substantially instantaneous creation of a clone that is a copy of a parent vvol in an aggregate of a storage system. FIG. 5 is a schematic block diagram illustrating an embodiment of an aggregate 500 that may be advantageously used with the present disclosure. The aggregate 500 contains at least one vvol, hereinafter parent vvol 505. The parent vvol 505 comprises a parent container file 510 that is represented as a parent buffer tree having a plurality of blocks in the aggregate, including inode 512, level 1 indirect blocks 514, which are organized as parent container map 515, and level 0 data blocks 516, which comprise all of the blocks used by the parent vvol 505, including a volinfo block 518. Each block includes one or more pointers that reference (point to) physical blocks located on disk 520. In the illustrative hybrid vvol embodiment, the pointers within the vvol are aggregate block numbers, such as pvbns.

As noted, a vvol (such as parent vvol 505) generally has the same inode file structure/content as the aggregate, including its own inode file and distinct inode space with corresponding inode numbers, as well as its own root (fsid) directory and subdirectories of files (inodes). To that end, the parent vvol 505 has a volinfo block 518 that points to one or more fsinfo blocks that, in turn, points to an inode of an inode file that has the same inode structure/content as the aggregate with the exceptions previously noted. The inode for the inode file contains information describing the inode file associated with a file system, such as file system 280, executing on the parent vvol 505. The inode for the inode file may contain a pointer that references (points to) an inode file indirect block containing a set of pointers that reference inodes within its root directory. Each inode contains pointers to indirect blocks, such as level 1 indirect blocks and each indirect block includes pointers to level 0 data blocks.

A snapshot can be created from the parent vvol 505 in accordance with a conventional snapshot mechanism. When the file system 280 generates a parent vvol snapshot (hereinafter "base snapshot" 535) of its active file system, an image of the active file system at a point in time (i.e., a consistently point, CP) is "frozen". Note that the base snapshot 535 is contained within and uses blocks in the parent container file 510. As a result, there is no container file for the base snapshot 535 as the snapshot reuses shared blocks in the vvbn space (and pvbn space) with the parent's active file system. However, for purposes of depiction and ease of description, a "snapshot container file 540" is shown and described with respect to FIG. 5. Yet is should be noted that blocks in the parent container file 510 are "held down" by the base snapshot 535 and the clone (described herein) shares the same pvbns. Moreover, the clone uses blocks in the vvbn space for which it has no pointers in its container; this is what keeps the clone from freeing the parent's blocks.

As illustratively shown, the base snapshot 535 comprises a snapshot container file 540 (similar to parent container file 510) that is represented as a snapshot buffer tree having a plurality of blocks in the aggregate, including inode 542, level 1 indirect blocks 544, which are organized as snapshot container map 545 (similar to parent container map 515), and level 0 data blocks 546, which comprise all of the blocks used by the base snapshot 535, including a snapshot volinfo block 548. The snapshot volinfo block 548 is a duplicate copy of the volinfo block 518 of the parent vvol 505. Accordingly, the base snapshot 535 shares data structures, such as fsinfo blocks, as well as inodes, indirect blocks and data blocks of an inode buffer tree, with the active file system to on parent vvol 505. An instance of the parent vvol "file" in the active file system thus cannot be deleted if the instance of the same file in the snapshot is to be preserved.

The cloning technique is employed to create a new vvol (e.g., filesystem file), along with a new fsid subdirectory in the aggregate and a new storage label file. The new vvol is embodied as a clone 650 and comprises an appropriately sized clone application 640 represented as a clone buffer tree having a plurality of blocks in the aggregate, including inode 672, level 1 indirect blocks 674, which are organized as a clone container map 645 and level 0 data blocks 676, which comprise all of the blocks used by the clone. Initially the clone application 640 has no (zero) data, i.e., it is entirely sparse, and the container map 645 is empty. Moreover, a volinfo block for the clone is created that is a slightly modified version of the volinfo block 548 from the base PCPI 535. The modified volinfo block 652 is written to (store at a level 0 data block of) the application 640 of the new vvol clone, i.e., the clone is inserted at the volinfo block location of the new vvol.

Figure 6:
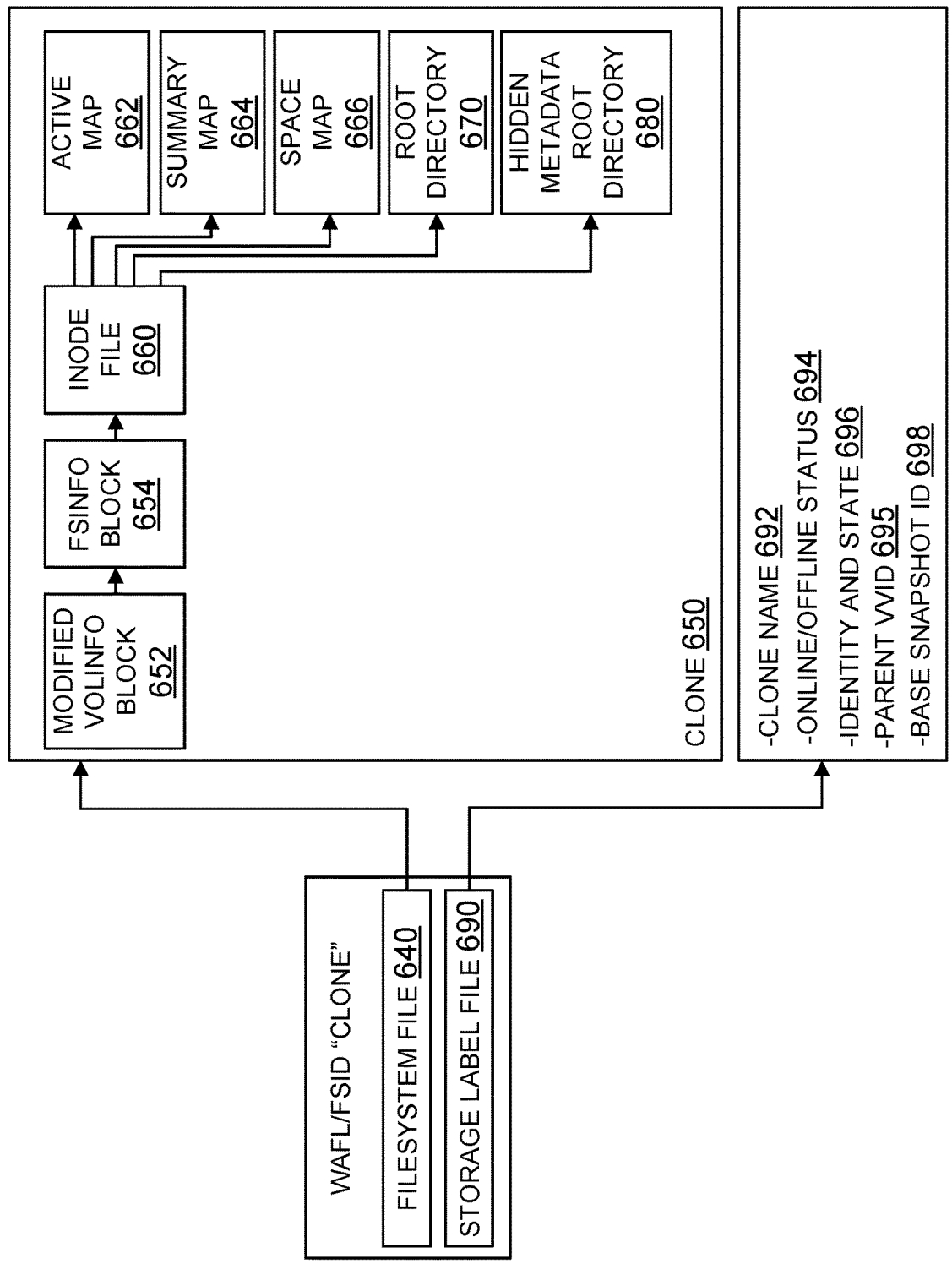
FIG. 6 is a schematic block diagram of an on-disk representation of clone.

FIG. 6 is a schematic block diagram of an on-disk representation of clone 650. The metadata root directory the aggregate is modified to include a new fsid "clone" subdirectory having at least two new files, application 640 and storage label file 690: WAFL/fsid "clone"/filesystem file, storage label file. As noted, the storage label file is a small file that functions as an analog to a conventional raid label and, to that end, the new storage label file 690 includes the name 692 of the clone 650, the online/offline status 694 of the clone, and other identity and state information 696 of the associated clone 650.

Similarly, the new application 640 is a large sparse file that contains all blocks owned by a vvol (clone) and, as such, is also referred to as the container file for the clone. The new application 640 includes a block pointer that references a file system embodied as clone 650. As a vvol, the clone 650 has a vvol space with special reserved inode numbers that are used for, among other things, the block allocation bitmap structures. As further described herein, the block allocation bitmap structures, e.g., active map 662, summary map 664 and space map 666, are inherited from the base snapshot 535 (and thus the parent vvol 505).

Specifically, the clone 650 includes a volinfo block 652 that points to a fsinfo block that, in turn, points to an inode of inode file that has the same inode structure/content as the aggregate with the exceptions previously noted. The inode for the inode file contains information describing the inode file 560 associated with the file system, such as file system 280, executing on the clone 650. The inode for the inode file may contain a pointer that references (points to) an inode file indirect block containing a set of pointers that reference inodes within root directory 670 of the clone 650. Each inode contains pointers to indirect blocks, such as level 1 indirect blocks and each indirect block includes pointers to level 0 data blocks.

Referring also to FIG. 5, the PCPI volinfo block 548 from the base PCPI 535 is inserted as a level 0 data block (volinfo block 652) within the application 640 on the clone. The volinfo block 652 is a slightly modified version of the PCPI volinfo block 548; for example, the volinfo block 652 is modified to delete all PCPIs (fsinfo blocks) other than fsinfo block 654 for the base PCPI 535. The inherited summary map 664 is also modified to reflect that all non-cloned snapshots have been removed (deleted) from the clone. The modified volinfo block 652 is thus substantially similar to PCPI volinfo block 548 and, to that end, essentially incorporates the base PCPI into the clone; accordingly the base PCPI (and its associated safeguards) protects the snapshotted blocks from being overwritten. All new changes are written to block locations in the vvbn and pvbn spaces of the base PCPI that are not used and, thus, cannot interfere with the clone.

Since the modified volinfo block 652 forms the root of a modified volinfo buffer tree that is similar to a parent volinfo block buffer tree of its parent vvol 505, all blocks of the parent volinfo block buffer tree can be accessed when traversing the modified volinfo block buffer tree. In other words, the PCPI volinfo block 548 stored in a level 0 block of the PCPI container file 540 (actually the parent's container file 510) contains pointers that reference other blocks of its buffer tree stored in other level 0 blocks 546 (516) of the container file 540 (510). The pointers within the volinfo block 548 to the other level 0 blocks 546 are physical pointers (pvbns) that reference physical block locations on disk 520. Those parent (PCPI) volinfo buffer tree blocks can be accessed through the modified volinfo block 652 of the clone 650 in the same manner as traversing the PCPI container file tree 540 because the blocks within the modified volinfo block buffer tree are the physical blocks represented by the level 0 data blocks 546 in the PCPI container file 540.

The clone 650 may then be instantiated by, e.g., loading a file system associated with the new vvol onto the clone and bringing the clone "online", with the only blocks owned by the clone comprising its modified volinfo block. The file system, such as file system 280, executes on the clone as it would on a typical vvol, such as the parent vvol. In fact, the file system within the clone resembles the file system within the base PCPI, since they comprise substantially the same blocks on disk. The resulting clone 650 is thus a "full-fledged" vvol, i.e., it can service storage (read and write) requests and has its own logical properties, such as snapshot operation functionality, that enables the clone to be snapshotted, snap restored, snapmirrored and otherwise manipulated as any other vvol. A restriction is that the base PCPI 535 cannot be deleted in the parent vvol 505 while the clone exists. As a result, the cloning technique enables the clone and parent vvol to share on-disk blocks of data in a zero-copy fashion, similar to a conventional PCPI, while also allowing for modifications (unlike the conventional PCPI).

As noted, a parent vvol, such as parent vvol 505, includes a container file, such as container file 510, having a plurality of blocks, such as inode 512, level 1 indirect blocks 514 and level 0 data blocks 516. A clone, such as clone 650, may be created from a base snapshot 535 of the parent vvol 505 in accordance with the cloning technique described herein. The parent and clone have the same sized vbn space and, initially, all blocks (other than the modified volinfo block 652) of application 640 of the clone 650 are shared with the parent vvol 505 (and/or base snapshot 535). The clone splitting technique essentially "splits" those shared blocks between the parent vvol (base snapshot) and the clone to thereby enable the clone to become a complete independent volume.

Figure 7:
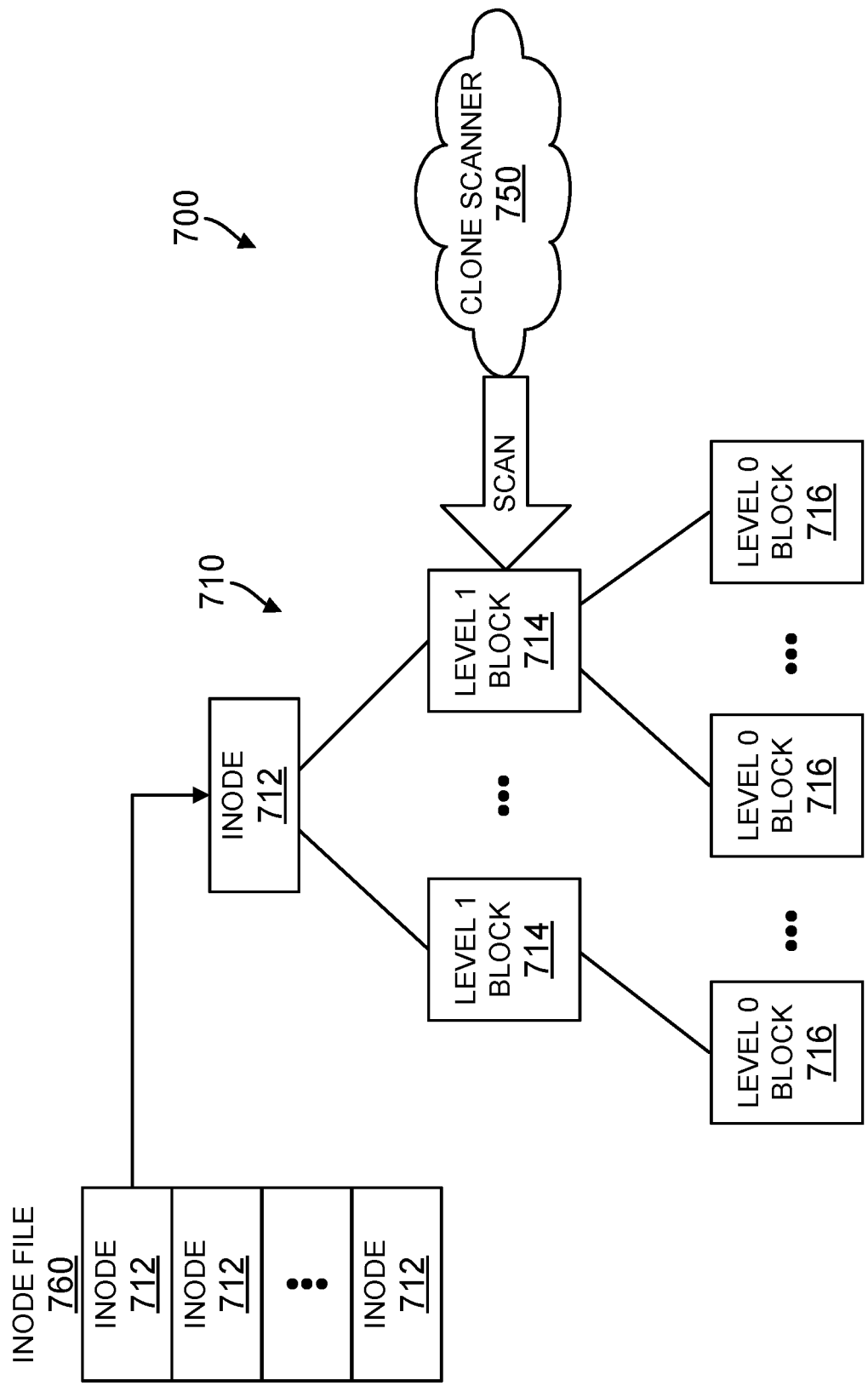
FIG. 7 is a schematic block diagram illustrating an illustrative clone-splitting technique.

FIG. 7 is a schematic block diagram illustrating an illustrative clone-splitting technique 700. As also noted, the clone 650 includes, among other things, an inode file 660. All inodes 712 of the file system (executing on the clone) are organized into the inode file 660. Each inode 712 forms the root of an inode buffer tree 710 and contains pointers to indirect blocks, such as level 1 (L1) indirect blocks 714 and each indirect block includes pointers to level 0 (L0) data blocks 716. A scanner 750 scans (traverses) the entire inode buffer tree 710 of each inode 712 and determines whether to initiate writing of a new copy of a block used in the clone to a level 0 data block 676 of the clone container file 640 and subsequently deleting the inode 712; this determination is dependent upon whether the block is not owned by the clone. The scanner 750 is illustratively an inode-based file system scanner configured to run over an online volume, such as clone 750, to thereby enable access to the clone during the shared block splitting procedure.

Volume Copying

As noted, the present disclosure employs a copying technique that can enable efficient and substantially instantaneous creation of a copy of a parent vvol in a separate aggregate of a storage system to create a split volume. Referring to FIG. 5, the parent vvol 505 comprises a parent container file 510 that is represented as a parent buffer tree having a plurality of blocks in the aggregate, including inode 512, level 1 indirect blocks 514, which are organized as parent container map 515, and level 0 data blocks 516, which comprise all of the blocks used by the parent vvol 505, including a volinfo block 518. Each block includes one or more pointers that reference (point to) physical blocks located on disk 520. In the illustrative hybrid vvol embodiment, the pointers within the vvol are aggregate block numbers, such as pvbns. The root (fsid) directory and subdirectories of files (inodes) are copied to a new metafile called split-ancestry-metafile. This represents the subtree that has been split.

The scanner 750 can search the index for changed base/incremental inode file. For example, the scanner 750 can determine if the inode file is unused, where the scanner 750 determines no further action is necessary. Further, the scanner 750 can determine if the inode is a directory file. If the scanner 750 determines the inode is a directory file, the scanner 750 will then check if it is present in the split-ancestry-metafile where it is redirected to the split volume. Where the directory file is not present in the split-ancestry-metafile, then the directory file is located on the parent vvol 505. Where the scanner 750 determines the inode is not a directory, the scanner 750 check if its parent is in the split ancestry metafile, where it is redirected to the split-volume. A file handler (fh) can be added to the split-ancestry-metafile. If the parent is not in the split ancestry metafile, then the parent is searched on the parent vvol 505.

Snapshot Access

In either implementing the volume clone operation or the vol-copy operation, the new volumes need to have snapshot access to older snapshots from the parent vvol 505. At the time of split, the list of snapshot identifiers ("snapids") that have the split-point directory can be copied to the new volume. In this way, snapshots that are valid for the split sub-tree can be detected. On the new volume, incore truncate the rootdir of snapshots to show only the split sub-tree. Furthermore, an access to an old snapshot from the new volume will forward the access to the source volume an obtain information from the source volume and respond to client ops on the new volume. In some embodiments, snapids that do not contain the split point can be reused on the new volume for new snapshots after the split. Once split, the volume is enabled to take snapshots as long as there are free snapids.

The foregoing description has been directed to specific embodiments of this disclosure. It will be apparent; however, that other variations and modifications may be made to the described embodiments, with the attainment of some or all of their advantages. For instance, it is expressly contemplated that the teachings of this disclosure can be implemented as software (including a computer-readable medium having program instructions executing on a computer), hardware, firmware, or a combination thereof. Accordingly this description is to be taken only by way of example and not to otherwise limit the scope of the disclosure. Therefore, it is the object of the appended claims to cover all such variations and modifications as come within the true spirit and scope of the disclosure.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method, comprising:
identifying by a processor in a networked storage system, a split-point for a splitting a parent volume hosting a plurality of applications, the split-point based on a first directory that hosts a first application;
determining by the processor, whether the parent volume can be split into a new volume at a first aggregate of the parent volume;
splitting the parent volume, by the processor, into the new volume by a volume clone operation, when the first aggregate is used for both the parent and the new volume;
using a volume copy operation by the processor to split the parent volume, when a second aggregate is used for the new volume and the parent volume uses the first aggregate;
wherein the new volume comprises the first application and stores a snapshot identifier for a snapshot of the parent volume taken prior to splitting the parent volume and the snapshot identifier includes the first directory;
wherein the new volume stores a data structure that is a subset of a metadata structure of the parent volume, the metadata structure storing a first mapping of all directories and corresponding child directories at the parent volume;
wherein directories under the split-point are included within the data structure at the new volume for the first application; and
providing access to the snapshot of the parent volume at the new volume using the snapshot identifier.

2. The method of claim 1, wherein the volume clone operation comprises creating a clone volume on the first aggregate based on the snapshot of the parent volume.

3. The method of claim 1, wherein the volume copy operation comprises creating a copy volume on the second aggregate.

4. The method of claim 1, wherein the metadata structure maintains a second mapping for every directory at the parent volume, the second mapping includes each directory and its sibling directories, and the data structure at the new volume is based on the first and the second mapping.

5. The method of claim 1, further comprising providing a snapshot of the new volume with free snapshot identifiers.

6. A non-transitory machine-readable medium having stored thereon instructions for performing a method, comprising machine executable code which when executed by at least one machine, causes the machine to:
identify in a networked storage system, a split-point for a splitting a parent volume hosting a plurality of applications, the split-point based on a first directory that hosts a first application;
determine whether the parent volume can be split into a new volume at a first aggregate of the parent volume;
split the parent volume into the new volume by a volume clone operation, when the first aggregate is used for both the parent and the new volume;
use a volume copy operation to split the parent volume, when a second aggregate is used for the new volume and the parent volume uses the first aggregate;
wherein the new volume comprises the first application and stores a snapshot identifier for a snapshot of the parent volume taken prior to splitting the parent volume and the snapshot identifier includes the first directory;
wherein the new volume stores a data structure that is a subset of a metadata structure of the parent volume, the metadata structure storing a first mapping of all directories and corresponding child directories at the parent volume;
wherein directories under the split-point are included within the data structure at the new volume for the first application; and
provide access to the snapshot of the parent volume at the new volume using the snapshot identifier.

7. The non-transitory machine-readable medium of claim 6, wherein the volume clone operation comprises creating a clone volume on the first aggregate based on the snapshot of the parent volume.

8. The non-transitory machine-readable medium of claim 6, wherein the volume copy operation comprises creating a copy volume on the second aggregate.

9. The non-transitory machine-readable medium of claim 6, wherein the metadata structure maintains a second mapping for every directory at the parent volume, the second mapping includes each directory and its sibling directories, and the data structure at the new volume is based on the first and the second mapping.

10. The non-transitory machine-readable medium of claim 6, further comprising providing a snapshot of the new volume with free snapshot identifiers.

11. A computing device, comprising:
a memory containing machine readable medium comprising machine executable code having stored thereon instructions;
a processor coupled to the memory, the processor configured to execute the machine executable code to cause the processor to:
identify in a networked storage system, a split-point for a splitting a parent volume hosting a plurality of applications, the split-point based on a first directory that hosts a first application;
determine whether the parent volume can be split into a new volume at a first aggregate of the parent volume;
split the parent volume into the new volume by a volume clone operation, when the first aggregate is used for both the parent and the new volume;
use a volume copy operation to split the parent volume, when a second aggregate is used for the new volume and the parent volume uses the first aggregate;
wherein the new volume comprises the first application and stores a snapshot identifier for a snapshot of the parent volume taken prior to splitting the parent volume and the snapshot identifier includes the first directory;
wherein the new volume stores a data structure that is a subset of a metadata structure of the parent volume, the metadata structure storing a first mapping of all directories and corresponding child directories at the parent volume;
wherein directories under the split-point are included within the data structure at the new volume for the first application; and
provide access to the snapshot of the parent volume at the new volume using the snapshot identifier.

12. The computing device of claim 11, wherein the volume clone operation comprises creating a clone volume on the first aggregate based on the snapshot of the parent volume.

13. The computing device of claim 11, wherein the volume copy operation comprises creating a copy volume on the second aggregate.

14. The computing device of claim 11, wherein the metadata structure maintains a second mapping for every directory at the parent volume, the second mapping includes each directory and its sibling directories, and the data structure at the new volume is based on the first and the second mapping.

15. The computing device of claim 11, further comprising providing a snapshot of the new volume with free snapshot identifiers.

16. The method of claim 1, wherein access to the snapshot is based on using snapshot identifiers that include the split-point directory for the first application.

17. The non-transitory machine-readable medium of claim 6, wherein access to the snapshot is based on using snapshot identifiers that include the split-point directory for the first application.

* * * * *